US012717774B2

(12) United States Patent
Xiong et al.

(10) Patent No.: US 12,717,774 B2

(45) Date of Patent: Aug. 25, 2026

(54) NODE SWITCHOVER METHOD AND RELATED SYSTEM

(71) Applicant: Huawei Cloud Computing Technologies Co., Ltd., Guizhou (CN)

(72) Inventors: Gang Xiong, Hangzhou (CN); Lixun Peng, Hangzhou (CN)

(73) Assignee: Huawei Cloud Computing Technologies Co., Ltd., Guizhou (CN)

( * ) Notice: Subject to any disclaimer, the term of this patent is extended or adjusted under 35 U.S.C. 154(b) by 0 days.

(21) Appl. No.: 18/824,928

(22) Filed: Sep. 5, 2024

(65) Prior Publication Data

US 2024/0427759 A1 Dec. 26, 2024

Related U.S. Application Data

(63) Continuation of application No. PCT/CN2022/130466, filed on Nov. 8, 2022.

(30) Foreign Application Priority Data

Mar. 22, 2022 (CN) ........................ 202210283773.X

(51) Int. Cl.
*G06F 16/23* (2019.01)
*G06F 16/25* (2019.01)
*G06F 16/27* (2019.01)

(52) U.S. Cl.
CPC ........ *G06F 16/2379* (2019.01); *G06F 16/252* (2019.01); *G06F 16/27* (2019.01)

(58) Field of Classification Search
CPC .... G06F 16/27; G06F 16/252; G06F 16/2379; G06F 16/2433; G06F 16/273;

(Continued)

(56) References Cited

U.S. PATENT DOCUMENTS 11,436,211 B1 * 9/2022 Perianayagam ...... G06F 16/252
2019/0095293 A1 3/2019 Zhang et al.

(Continued)

FOREIGN PATENT DOCUMENTS

CN 105824846 A 8/2016
CN 107153680 A 9/2017

OTHER PUBLICATIONS

Ronstroem M: "Design and Modelling of a Parallel Data Server for Telecom Applications", Internet Citation, Jan. 1, 1997 (Jan. 1, 1997), XP001167345, total 255 pages.

*Primary Examiner* — Marcin R Filipczyk

(57) ABSTRACT

A node switchover method is provided, including: A source database nod executes a first query command. Then, the source database node sends target data to a destination database node, where the target data is data for executing a second query command in an execution result of the first query command. Next, the destination database node executes the second query command by using the target data. In the method, some complex operations implemented for node switchover sink to a database node, so that a routing node at which middleware is located does not need to identify a query statement, record a transaction state in real time, or cache a large quantity of query commands that change operation context. This avoids consuming more processor and memory resources of the routing node, reduces costs and overheads of the routing node, and ensures service performance.

20 Claims, 7 Drawing Sheets

(58) Field of Classification Search
CPC .. G06F 16/275; G06F 16/278; G06F 11/2064; H04L 45/28; H04L 45/60
See application file for complete search history.

(56) References Cited

U.S. PATENT DOCUMENTS

2019/0311057 A1* 10/2019 Sung ................. G06F 16/24542
2019/0392067 A1* 12/2019 Sonawane ............. G06F 16/245

* cited by examiner

NODE SWITCHOVER METHOD AND RELATED SYSTEM

CROSS-REFERENCE TO RELATED APPLICATIONS

This application is a continuation of International Patent Application No. PCT/CN2022/130466, filed on Nov. 8, 2022, which claims priority to Chinese Patent Application No. 202210283773.X, filed on Mar. 22, 2022. The disclosures of the aforementioned applications are hereby incorporated by reference in their entireties.

TECHNICAL FIELD

This application relates to the field of data processing technologies, and in particular, to a node switchover method, a node switchover system, a computer cluster, a computer-readable storage medium, and a computer program product.

BACKGROUND

During running, an application (APP) usually connects to a database node (DB node) and creates a session object in the database node. During a data operation, the application maintains operation context such as a system variable, a user defined variable, a transaction status, or a user temporary table in the session object.

As a flavor of the application changes or a version of the application is upgraded, the database node connected to the application usually needs to be switched. To meet a requirement of high availability, application lossless and transparent (ALT) switchover usually may be performed. Through the ALT switchover, a switchover process can be transparent to an application, and a service is lossless after the switchover.

At present, in a related technology, a middleware-based connection retention enhancement technology is used to implement ALT switchover. Middleware may be software located between an application and a database node, and the middleware may be, for example, a proxy. Specifically, the proxy keeps a front-end connection (a connection between the proxy and the application) uninterrupted. During application running, the proxy monitors an execution process of a transaction, and caches a structured query language command (SQL command) that changes operation context in a session object. After the database node is switched, the cached SQL command is executed in a new session object (a session object on a node after the switchover), to maintain a previous transaction state in the new session object.

However, in the foregoing method, the middleware such as the proxy needs to identify an SQL statement, record a transaction state in real time, and cache the SQL command that changes the operation context, which consumes a large quantity of processor and memory resources. Consequently, performance of an actually running service is affected.

SUMMARY

This application provides a node switchover method. In the method, some complex operations implemented for node switchover sink to a database node from a routing node (for example, a node at which middleware is located), so that the routing node does not need to identify an SQL statement, record a transaction state in real time, or cache a large quantity of query commands that change operation context. This avoids consuming more processor and memory resources of the routing node, reduces costs and overheads of the routing node, and ensures service performance. This application further provides a corresponding node switchover system, computer cluster, computer-readable storage medium, and computer program product.

According to a first aspect, this application provides a node switchover method. The method may be performed by a node switchover system. The node switchover system includes a source database node and a destination database node. The source database node is a database node connected to an application before switchover, and the destination database node is a database node connected to the application after switchover.

Specifically, the source database node executes a first query command, and then, the source database node sends the target data to the destination database node, where the target data is data for executing a second query command in an execution result of the first query command. For example, the target data may include operation context and a transaction state. The operation context may include one or more of a system variable, a user defined variable, a transaction status (different states of a transaction), and a user temporary table. The destination database node executes the second query command by using the target data.

In the method, some complex operations implemented for node switchover sink to a database node, so that a routing node at which middleware is located does not need to identify an SQL statement, record a transaction state in real time, or cache a large quantity of query commands that change operation context. This avoids consuming more processor and memory resources of the routing node, reduces costs and overheads of the routing node, and ensures service performance.

In some possible implementations, the first query command is a command in a first transaction, and the second query command is a command in a second transaction. In other words, the source database node may intercept a transaction completion boundary by using a drain transaction component, and when the first transaction reaches the transaction completion boundary, forward a subsequent command like the second query command in the second transaction to the destination database node, and the destination database node executes the second query command in the second transaction, so that the database node connected to the application is switched from the source database node to the destination database node.

In the method, node switchover is completed between transactions, ensuring that a service is lossless and transparent to a user.

In some possible implementations, the first query command and the second query command are commands in a same transaction. The source database node may intercept an execution boundary in the transaction by using a fine-grained drain transaction component, and when the transaction reaches the execution boundary, forward a subsequent command in the transaction like the second query command to the destination database node, and the destination database node executes the second query command, so that the database node connected to the application is switched from the source database node to the destination database node.

In the method, a drain transaction capability is extended by draining a transaction at a fine granularity. In comparison with a connection retention enhancement technology in which draining of a transaction is confirmed only after a submitted query command is intercepted within specified time, in the method, draining of a transaction is confirmed by intercepting an execution boundary in the transaction when a submitted query command is not intercepted within specified time. This can implement node switchover in the transaction, shorten node switchover time, and improve node switchover efficiency.

In some possible implementations, the node switchover system further includes a routing node. Before the destination database node executes the second query command by using the target data, the routing node may route the first query command to the destination database node, so that the destination database node executes the first query command.

In this way, reliability of node switchover can be ensured by re-executing the first query command once. In addition, in the method, there is no need to re-execute a large quantity of query commands, but a query command is re-executed at most once. In this way, node switchover time is shortened, and a case in which operation context in the source database node is inconsistent with that in the destination database node due to an execution sequence or the like when a large quantity of query commands are executed in the destination database node is avoided, to implement lossless switchover.

In some possible implementations, the source database node sends a return code to the routing node after detecting that the transaction reaches a specified execution site, where the return code indicates the destination database node to execute the first query command. There may be one or more specified execution sites. For example, the specified execution site may be one or more execution boundaries in the transaction.

In the method, the routing node does not need to intercept all query commands and parse the query commands, but processes a return code of a query command. When the return code is a special error code and is a return code indicating the destination database node to re-execute the query command (for example, the first query command), the routing node may forward the first query command to the destination database node, so that the destination database node executes the first query command, to implement node switchover.

The routing node provides a simple ALT routing capability, and in an application running process, a query command does not need to be intercepted and parsed, and a query command for modifying operation context does not need to be identified and cached. This reduces a load of the routing node and enables a lightweight routing node to meet a service requirement.

In some possible implementations, the routing node may be a node on which the middleware is deployed, or a node on which a connector is deployed. In some embodiments, when the application is deployed in a form of a cloud service, the application may be connected to the routing node on which the middleware such as a proxy is deployed, and does not need to depend on a special client. In addition, in an ALT switchover process, a related interface does not need to be additionally invoked to participate in ALT switchover. This has high availability. In some other embodiments, the application may be deployed in a computer in a form of a client, and a connector of the client may integrate a routing capability as a routing node, so as to implement ALT switchover without middleware.

In some possible implementations, the source database node includes a first session object, the destination database node includes a second session object, and the source database node further sets an associated session logical identifier. The associated session logical identifier may be remotely created by the routing node, or may be created by the source database node based on identifiers that are sent by the routing node and that are of different back-end connections corresponding to a same front-end connection. Each back-end connection corresponds to one session object. The associated session logical identifier may be used to identify the first session object and the second session object, so as to associate the first session object with the second session object.

Correspondingly, the second query command may be sent to the second session object. For example, the application sends the second query command, and the routing node receives the second query command, and sends the second query command to the second session object of the destination database node. The destination database node uses the target data in the second session object to execute the second query command.

In the method, the first session object in the source database node is associated with the second session object in the destination database node based on the associated session logical identifier, so as to provide help for sending the target data to the second session object in the destination database node.

In some possible implementations, the associated session logical identifier further records a transaction identifier, and a transaction block corresponding to the transaction identifier is shared by the first session object and the second session object. In this way, the second session object in the destination database node may identify a result of sharing the transaction block, and perform transaction recovery and a maximum of one subsequent structured query language command retry action on demand.

In some possible implementations, the source database node is a database node connected to the application before a flavor or version change of the application, and the destination database node is a database node connected to the application after the flavor or version change of the application. In this way, lossless upgrade or lossless scale-out or scale-in of the application can be implemented, and transparent to the user, to improve user experience.

In some possible implementations, the source database node and the destination database node belong to a same service cluster, and a load of the source database node is greater than a load of the destination database node. In other words, the method can implement on-demand session switchover, to meet a load balancing requirement.

In some possible implementations, the source database node is a primary node, and the destination database node is a backup node. Specifically, when the primary node is about to be faulty or is about to be powered off, the node connected to the application may be switched to the backup node, so as to meet a high availability requirement.

In some possible implementations, the source database node and the destination database node are storage-compute decoupled cloud native database nodes. Specifically, a cloud native application may adaptively switch a cloud native database node to another cloud native database node based on a requirement, to meet a service requirement.

According to a second aspect, this application provides a node switchover system. The system includes a source database node and a destination database node.

The source database node is configured to execute a first query command, and send target data to the destination database node, where the target data is data for executing a second query command in an execution result of the first query command.

The destination database node is configured to execute the second query command by using the target data.

In some possible implementations, the first query command is a command in a first transaction, and the second query command is a command in a second transaction.

In some possible implementations, the first query command and the second query command are commands in a same transaction.

In some possible implementations, the system further includes:

a routing node, configured to: before the destination database node executes the second query command by using the target data, route the first query command to the destination database node, so that the destination database node executes the first query command.

In some possible implementations, the source database node is further configured to:

send a return code to the routing node after detecting that the transaction reaches a specified execution site, where the return code indicates the destination database node to execute the first query command.

In some possible implementations, the source database node includes a first session object, the destination database node includes a second session object, and the source database node is further configured to:

set an associated session logical identifier, where the associated session logical identifier identifies the first session object and the second session object, and the second query command is sent to the second session object.

The destination database node is configured to:

use the target data in the second session object to execute the second query command.

In some possible implementations, the associated session logical identifier further records a transaction identifier, and a transaction block corresponding to the transaction identifier is shared by the first session object and the second session object.

In some possible implementations, the source database node is a database node connected to an application before a flavor or version change of the application, and the destination database node is a database node connected to the application after the flavor or version change of the application.

In some possible implementations, the source database node and the destination database node belong to a same service cluster, and a load of the source database node is greater than a load of the destination database node.

In some possible implementations, the source database node is a primary node, and the destination database node is a backup node.

In some possible implementations, the source database node and the destination database node are storage-compute decoupled cloud native database nodes.

According to a third aspect, this application provides a computer cluster. The computer cluster includes a first computer and a second computer. The first computer is configured to implement a function of the source database node in the system according to any one of the implementations of the second aspect, and the second computer is configured to implement a function of the destination database node in the system according to any one of the implementations of the second aspect.

Each computer includes at least one processor and at least one memory. The at least one processor and the at least one memory communicate with each other. The at least one processor is configured to execute instructions stored in the at least one memory, so that the computer performs the node switchover method according to any one of the first aspect or the implementations of the first aspect.

According to a fourth aspect, this application provides a computer-readable storage medium, where the computer-readable storage medium stores instructions. The instructions instruct a computer cluster to perform the node switchover method according to any one of the first aspect or the implementations of the first aspect.

According to a fifth aspect, this application provides a computer program product including instructions. When the computer program product runs on a computer cluster, the computer cluster is enabled to perform the node switchover method according to any one of the first aspect or the implementations of the first aspect.

In this application, on the basis of the implementations according to the foregoing aspects, the implementations may be further combined to provide more implementations.

BRIEF DESCRIPTION OF DRAWINGS

To describe the technical methods in embodiments of this application more clearly, the following briefly describes the accompanying drawings for describing embodiments.

DESCRIPTION OF EMBODIMENTS

Figure 1:
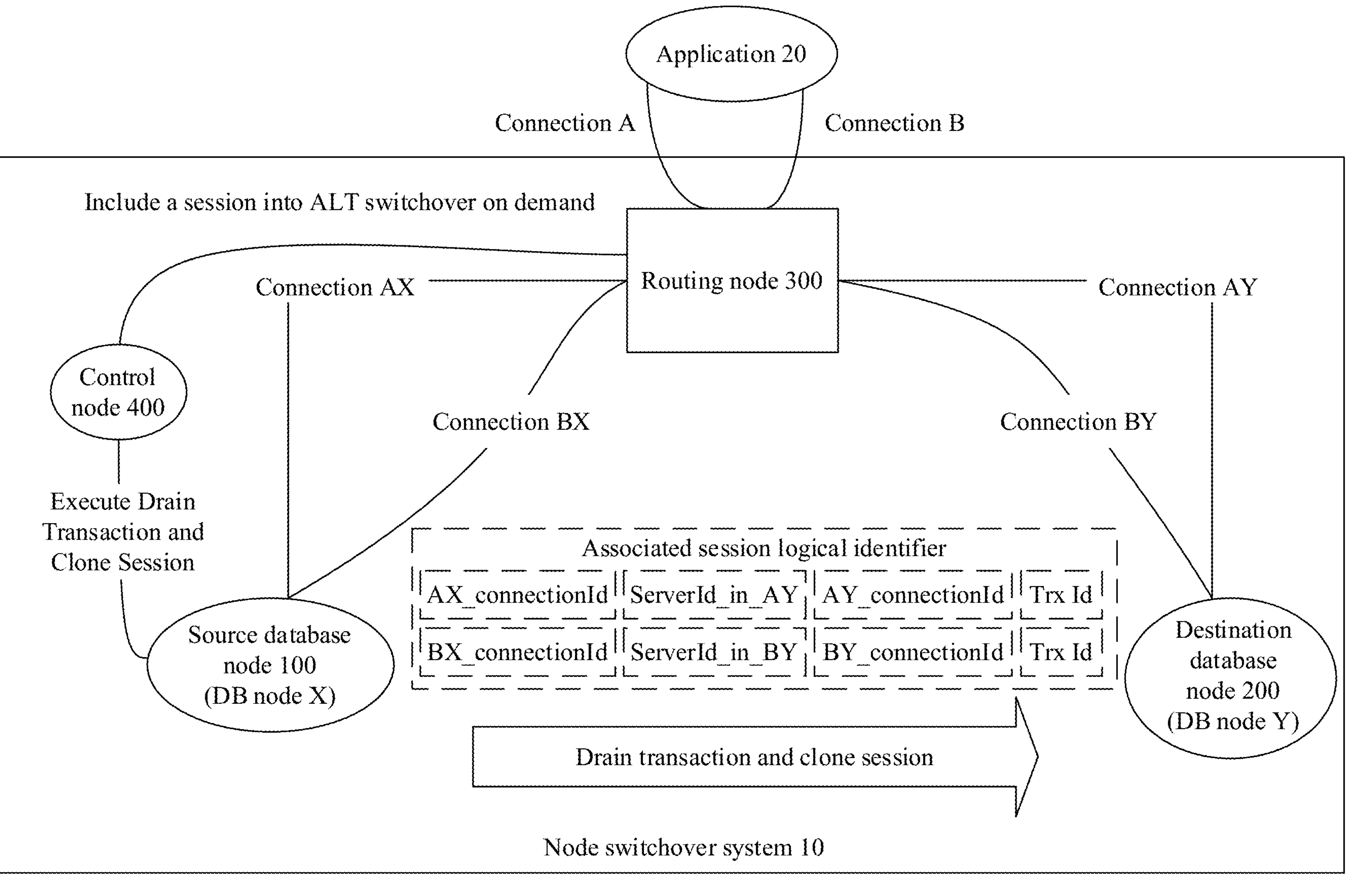
FIG. 1 is a diagram of an architecture of a node switchover system according to an embodiment of this application.

Terms “first” and “second” in embodiments of this application are merely intended for description, and shall not be understood as an indication or implication of relative importance or implicit indication of a quantity of indicated technical features. Therefore, a feature limited by “first” or “second” may explicitly or implicitly include one or more features.

First, some technical terms in embodiments of this application are described.

An application (APP) is short for an application program, and refers to a program written for a special application purpose of a user. For example, the application may include applications with different functions, such as a text processor, a table processor, a browser, a media player, an aeronautical flight simulator, a command-line game, an image editor, an online store, and a book management system.

Some applications are driven by databases. For example, applications such as the online store and the book management system are usually connected to database nodes (DB nodes) when running. The database node is a node on which a database is deployed. It should be noted that the database may be deployed on one node or in a cluster including a plurality of nodes. In this application, the node may be a physical node like a computer, or a logical node on a computer. The computer includes but is not limited to a device like a terminal or a server. The logical node on the computer may be obtained in a virtualization manner. For example, the logical node on the computer may be a virtual machine or container on the computer.

An application may create a session object in a database node. In a data operation process, the application maintains operation context such as a system variable, a user defined variable, a transaction status, or a user temporary table in the session object, so that the database node can provide better service experience based on the foregoing information in the session object.

In many scenarios, the database node connected to the application needs to be switched. For example, when a user scale changes, for example, from 1,000 users to 100,000 users, a flavor of a database management system (DBMS) engine (which may also be referred to as a database engine for short) used by the application (namely, a flavor of the application) also needs to change accordingly. Therefore, the database node connected to the application needs to be switched. For another example, when a version of the application is changed (for example, the version is upgraded), the database node connected to the application usually needs to be switched, to switch the application from a current version to a new version. In some cases, the application is further configured with an active standby node to ensure high availability (HA) of a service. The active/standby node includes a primary node and a backup node. When the primary node is faulty, the application may trigger an active/standby switchover, so as to switch the database node connected to the application from the primary node to the backup node. In addition, in a cloud scenario, a cloud-native application implements elastic scalability of storage resources through storage-compute decoupling. Therefore, a database node (namely, a cloud-native database node) connected to the cloud-native application needs to be switched.

To meet a requirement of high availability, application lossless and transparent (ALT) switchover usually may be performed. Through the ALT switchover, a switchover process can be transparent to an application, and a service can be lossless after the switchover. At present, in a related technology, a middleware-based connection retention enhancement technology is used to implement ALT switchover. Middleware may be software located between an application and a database node, and the middleware may be, for example, a proxy. Specifically, the proxy keeps a front-end connection (a connection between the proxy and the application) uninterrupted. During application running, the proxy monitors an execution process of a transaction, and caches a structured query language command (SQL command) that changes operation context in a session. After the database node is switched, the cached SQL command is executed in a new session object (a session object after the switchover), to maintain a previous transaction state in the new session object.

However, in the foregoing method, the middleware such as the proxy needs to identify an SQL statement, record a transaction state in real time, and cache the SQL command that changes the operation context, which consumes a large quantity of processor and memory resources. Consequently, performance of an actually running service is affected.

In view of this, an embodiment of this application provides a node switchover method. The method may be performed by a node switchover system. Specifically, the node switchover system includes a source database node and a destination database node. The source database node may execute a first query command, and then send data, namely, target data (for example, operation context), for executing a second query command in an execution result of the first query command to the destination database node. The destination database node executes the second query command by using the target data. In this way, a database node connected to an application is switched from the source database node to the destination database node.

In the method, some complex operations implemented for node switchover sink to a database node, so that a routing node at which middleware is located does not need to identify an SQL statement, record a transaction state in real time, or cache a large quantity of query commands that change operation context. This avoids consuming more processor and memory resources of the routing node, reduces costs and overheads of the routing node, and ensures service performance.

The node switchover method in this embodiment of this application may be applied to a planned switchover scenario of a database node, including a flavor change (for example, scale-out or scale-in) scenario, a version change (for example, version upgrade) scenario, and the like. The node switchover method in this embodiment of this application may be further applied to on-demand session switchover in multi-write deployment, to meet a load balancing requirement. The multi-write deployment means that an application is configured with a plurality of database nodes, and the plurality of database nodes belong to one service cluster. When loads of one or more database nodes (a source database node in this scenario) in the service cluster is heavy, a session may be switched to a database node (a destination database node in this scenario) with a light load in the service cluster based on a requirement, to implement load balancing.

The node switchover method in this embodiment of this application may be further applied to a conventional active/standby architecture database based on logical log replication or physical log replication. Specifically, when a primary node (a source database node in this scenario) is about to be faulty or is about to be powered off, a node connected to an application may be switched to a backup node (a destination database node in this scenario). The node switchover method in this embodiment of this application may be further applied to a cloud scenario. Specifically, a cloud native application may adaptively switch a connected cloud native database (Cloud Native Database) node (a source database node in this scenario) to another cloud native database node (a destination database node in this scenario) based on a requirement.

To make technical solutions of this application clearer and easier to understand, the following describes in detail a node switchover system in embodiments of this application with reference to the accompanying drawings.

Refer to a diagram of an architecture of a node switchover system shown in FIG. 1. The node switchover system 10 includes a source database node 100 and a destination database node 200. Database nodes such as the source database node 100 and the destination database node 200 are configured to provide an engine capability, for example, provide the engine capability through a database engine kernel (DB kernel). In the example in FIG. 1, the source database node 100 is denoted as a DB Node X, and the destination database node 200 is denoted as a DB Node Y. The database nodes are configured to provide data services for an application 20. Before node switchover, the source database node 100 provides a data service for the application 20, and after node switchover, the destination database node 200 provides a data service for the application 20.

Specifically, the source database node 100 is configured to execute a first query command, where the first query command may be a query command sent by the application 20. In some embodiments, the query command may be an SQL command, or a query command written in another query language. The source database node 100 is further configured to send data, namely, target data, for executing a second query command in an execution result of the first query command to the destination database node 200. The destination database node 200 is configured to execute the second query command by using the target data. Similar to the first query command, the second query command may be a query command sent by the application 20. In this way, the database node connected to the application 20 is switched from the source database node 100 to the destination database node 200.

In the example in FIG. 1, the node switchover system 10 further includes a routing node 300. The routing node 300 may be a node on which middleware such as a proxy is deployed, or a node on which a connector is deployed. The connector provides a manner of connecting to a database node for the application 20. The connector may be a connector provided by a database provider, or may be a connector provided by another service provider or a developer.

Specifically, the application 20 sends the first query command, the first query command reaches the routing node 300, and the routing node 300 routes the first query command to the source database node 100. The source database node 100 executes the first query command, and then sends the target data for executing the second query command in the execution result of the first query command to the destination database node. The source database node 100 may detect, after executing the first query command, whether a transaction in which the first query command is located reaches a specified execution site, that is, the source database node 100 executes drain transaction. When the transaction reaches the specified execution site, it indicates that the transaction is drained clean (drain clean). The source database node 100 may send, to the routing node 300, a return code indicating that the first query command is executed at the destination database node 200. For example, the return code may be ALT Retry. The routing node 300 routes the first query command to the destination database node 200 in response to the return code, so that the destination database node 200 executes the first query command before executing the second query command.

Further, the node switchover system 10 further includes a control node 400. The control node 400 is configured to schedule and control operations performed by the routing node 300 and the source database node 100 in an ALT switchover process. Specifically, the control node 400 may indicate the routing node 300 to include all session objects in the source database node 100 into ALT switchover, or include a session object in the source database node 100 into ALT switchover on demand. As shown in FIG. 1, the source database node 100 includes a plurality of session objects, which are a session AX and a session BX. The session AX and the session BX correspond to different front-end connections (for example, a connection A and a connection B) and back-end connections (for example, a connection AX and a connection BX). The control node 400 may indicate the routing node 300 to include the session AX and the session BX (which may be referred to as first session objects) in the source database node 100 into ALT switchover. The routing node 300 may create a session AY and a session BY (which may be referred to as second session objects) in the destination database node 200 based on the indication. The session AY and the session BY correspond to different front-end connections (for example, the connection A and the connection B) and back-end connections (for example, a connection AY and a connection BY).

Correspondingly, the source database node 100 may execute the first query command in the first session objects, and execute the drain transaction after receiving a drain transaction indication from the control node 400. When the transaction is drained, the source database node 100 sends, to the routing node 300, the return code indicating that the first query command is executed at the destination database node 200, for example, ALT Retry. The routing node 300 may first hold the first query command. The control node 400 then indicates the source database node 100 to execute clone session. The first session objects include the execution result of the first query command. Correspondingly, the source database node 100 sends the target data for executing the second query command in the execution result of the first query command to the destination database node 200 based on the clone session indication sent by the control node 400, for example, sends the target data to the second session objects of the destination database node 200. The destination database node 200 may execute the first query command in the second session objects such as the session AY and the session BY, and execute the second query command by using the target data.

In some possible implementations, the source database node 100 further sets an associated session logical identifier. The associated session logical identifier identifies a first session object and a second session object, and is used to identify the first session object and the second session object corresponding to a same front-end connection, so as to associate session objects corresponding to the same front-end connection. The first session object and the second session object correspond to different back-end connections. Therefore, the session objects may be identified by using identifiers of the back-end connections in the associated session logical identifier. As shown in FIG. 1, the associated session logical identifier includes an identifier AX_connectionId of the connection AX and an identifier AY_connectionId of the connection AY, so that the connection AX can be associated with the connection AY. Similarly, the associated session logical identifier includes an identifier BX_connectionId of the connection BX and an identifier BY_connectionId of the connection BY, so that the connection BX can be associated with the connection BY. Correspondingly, when sending the target data to the destination database node 200, the source database node 100 may send the target data to the second session objects of the destination database node 200 based on the associated session logical identifier. It should be noted that the associated session logical identifier further includes service identifiers of the second session objects, for example, ServerId_in_AY and ServerId_in_BY.

In this embodiment, the routing node 300 does not actively intercept a query command, but processes a return code of the query command. For example, the routing node 300 may obtain a return code of the first query command. When the return code indicates that the first query command is executed at the destination database node, for example, when the return code is ALT Retry, it indicates that the transaction to which the first query command belongs is at an execution site at a specific level of ALT switchover. The routing node 300 may hold the first structure query command, specifically, suspend the first query command, and do not return an execution result upwards. When receiving an end command of the control node 400, the routing node 300 forwards the second query command to the second session objects based on the associated session logical identifier, to execute the second query command in the second session objects, so as to implement switchover of the database node connected to the application 20. After node switchover is completed, a data operation of the application 20, for example, an operation, for example, addition, deletion, query, or modification, is forwarded by the routing node 300 to the destination database node 200, for example, the DB node Y, for performing the operation.

Figure 2:
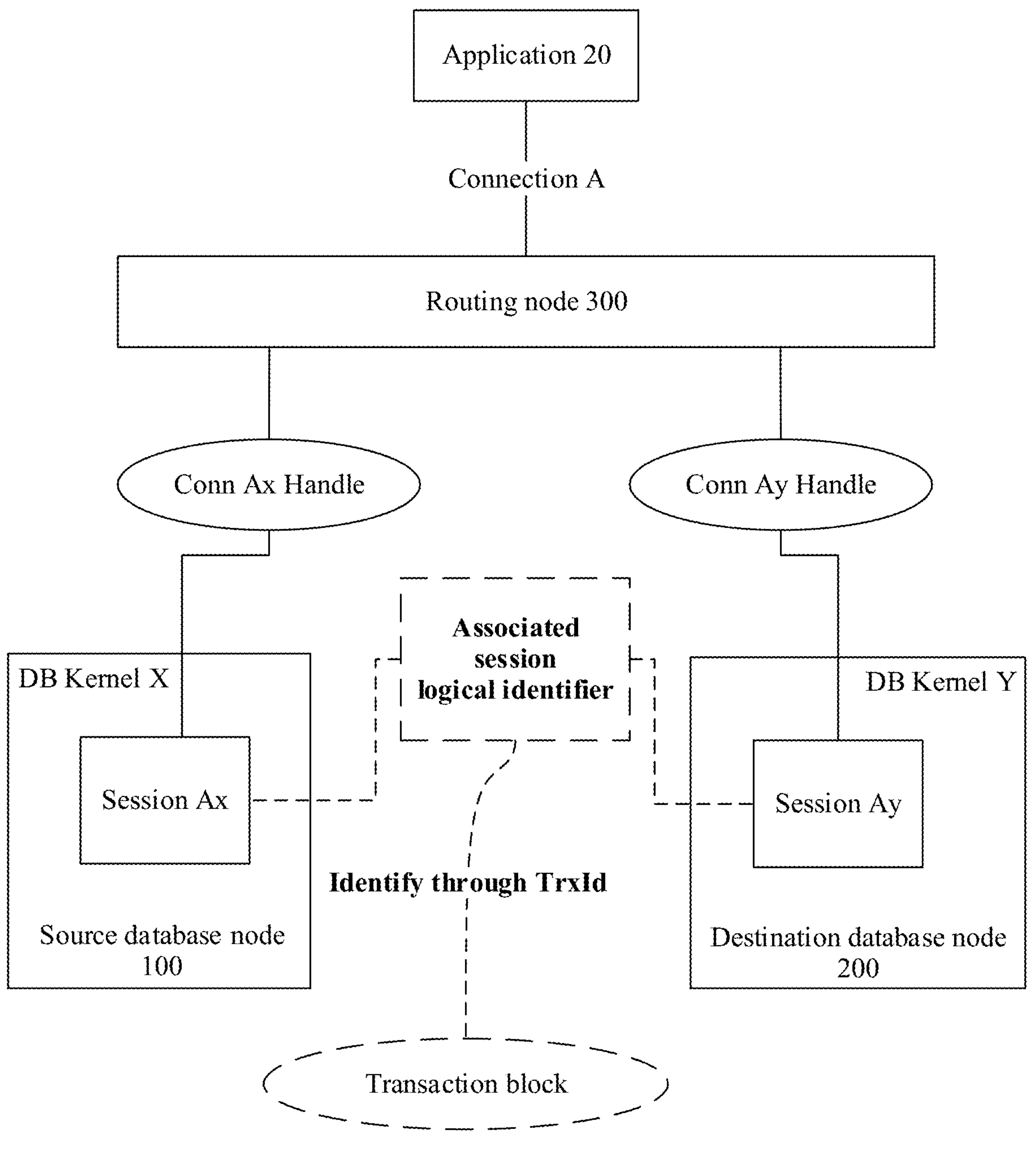
FIG. 2 is a diagram in which associated sessions share a transaction block according to an embodiment of this application.

Further, refer to a diagram of an associated session sharing transaction block shown in FIG. 2. The associated session logical identifier may further include a transaction identifier Trx Id. In this way, a transaction (Transaction) in a first session object (for example, the Session Ax) in the source database node 100 may be bound, and therefore, associated session objects (for example, the Session Ax and the Session Ay) share a transaction block (Transaction Block) of the transaction. Correspondingly, a second session object (for example, the Session Ay) in the destination database node 200 identifies a result of sharing the transaction block, and performs transaction recovery and a maximum of one subsequent query command retry action on demand.

The following describes in detail the node switchover method in embodiments of this application from an interaction perspective with reference to the accompanying drawings.

Figure 3A:
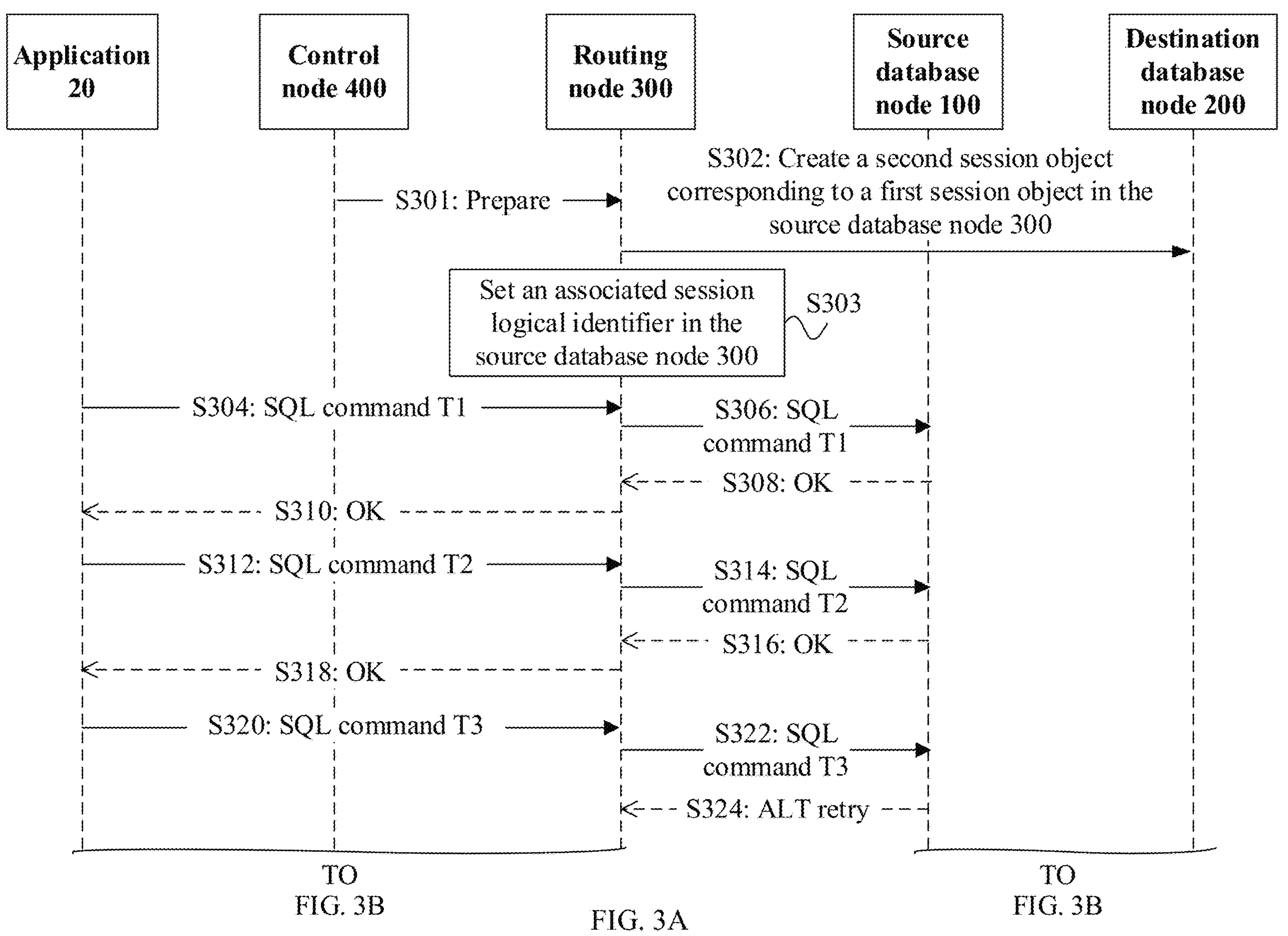
FIG. 3A and FIG. 3B are a flowchart of a node switchover method according to an embodiment of this application.
Figure 3B:
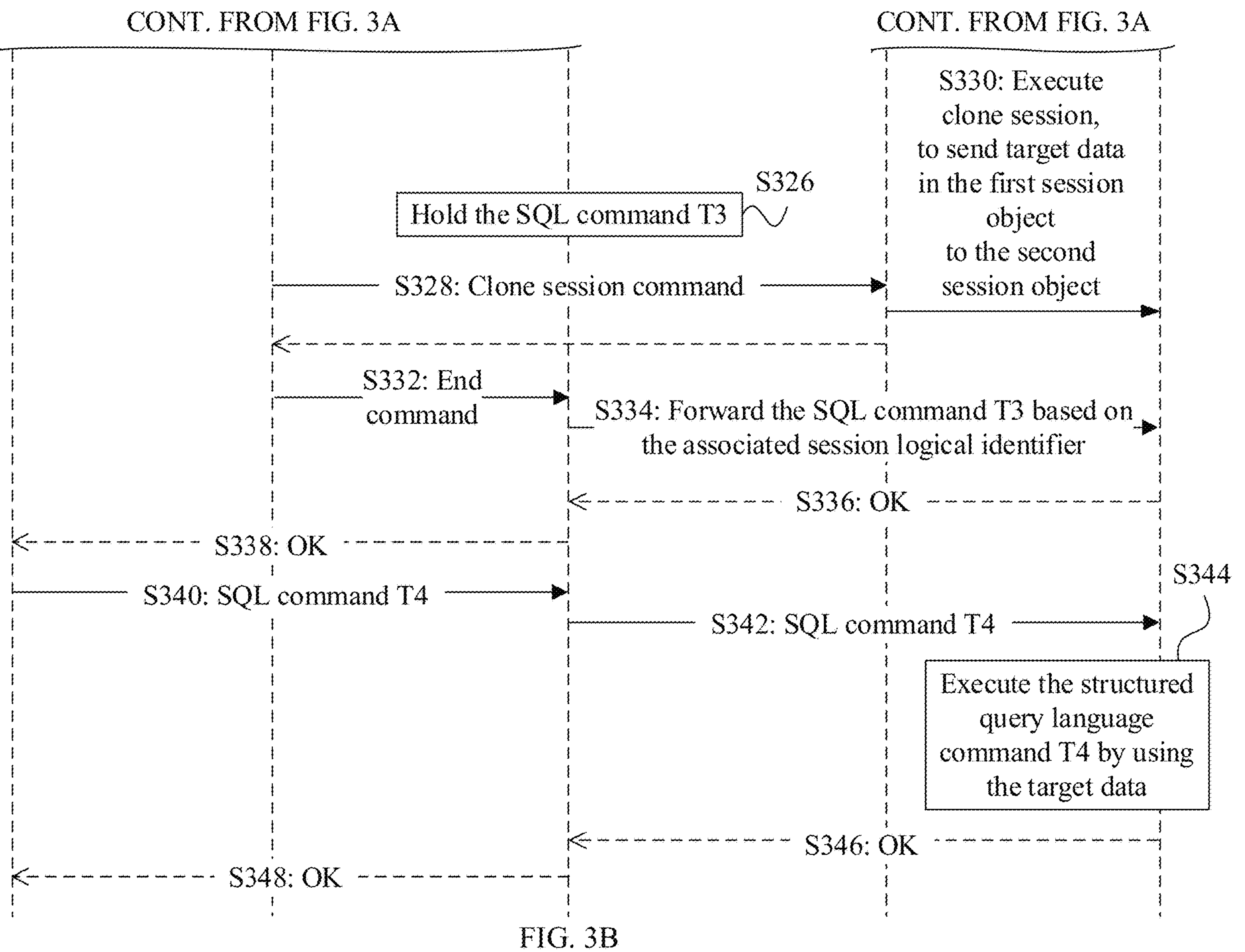

Refer to an interaction flowchart of a node switchover method shown in FIG. 3A and FIG. 3B. The method includes the following steps.

S301: A control node 400 sends a notification of entering a prepare phase to a routing node 300.

Specifically, the prepare phase indicates a prepare phase of ALT switchover. Before performing ALT switchover, the control node 400 may send, to the routing node 300, the notification of entering the prepare phase, to notify the routing node 300 of entering the prepare phase. In the prepare phase, the routing node 300 may perform related preparation work, to ensure that ALT switchover can be successfully performed.

S301 is an optional step in embodiments of this application, and S301 may not be performed when the node switchover method in embodiments of this application is performed. For example, the routing node 300 may prepare for ALT switchover without waiting for notification of the control node 400.

S302: The routing node 300 creates, in a destination database node 200, a second session object corresponding to a first session object in a source database node 100.

The destination database node 200 indicates a node to be connected to an application 20 after switchover. In embodiments, the destination database node 200 may be a preconfigured node, or may be a node allocated in real time. For example, in an active/standby switchover scenario, the destination database node 200 may be a preconfigured backup node. For another example, in a cloud native database scenario, the destination database node 200 may be one or more nodes that are randomly allocated in real time.

Specifically, the routing node 300 may remotely create, in the destination database node 200, the second session object corresponding to the first session object in the source database node 100. In some embodiments, the routing node 300 may alternatively send a session object creation command to the destination database node 200, and the destination database node 200 may create, in response to the session object creation command, the second session object corresponding to the first session object. The first session object may be all session objects in the source database node 100, or may be some session objects in the source database node 100. The routing node 300 creates the second session object in the destination database node 200 on demand.

It should be noted that S302 is an optional step in embodiments of this application, and S302 may not be performed when the node switchover method in embodiments of this application is performed. For example, the destination database node 200 may alternatively reuse an existing session object, and no new session object needs to be created.

S303: The routing node 300 sets an associated session logical identifier in the source database node 100.

Specifically, the routing node 300 may obtain an identifier of a front-end connection and an identifier of a back-end connection of each session object, and may determine, based on the identifier of the front-end connection and the identifier of the back-end connection, a plurality of session objects corresponding to a same front-end connection and different back-end connections. The routing node 300 may set a data structure in the source database node 100 to associate the plurality of session objects, so as to obtain an associated session. The data structure is recorded as the associated session logical identifier. The associated session logical identifier includes identifiers of the different back-end connections corresponding to the plurality of session objects corresponding to the same front-end connection.

As shown in FIG. 1, the session AX and the session AY correspond to a same front-end connection (the connection A), and correspond to different back-end connections, for example, the connection AX and the connection AY. The routing node 300 sets an associated session logical identifier in the source database node 100. The associated session logical identifier includes AX_connectionId and AY_connectionId, so that the session AX can be associated with the session AY. Similarly, the associated session logical identifier includes BX_connectionId and BY_connectionId, so that the session BX can be associated with the session BY.

Further, the associated session logical identifier may further include a service identifier or a transaction identifier. As shown in FIG. 1, the associated session logical identifier includes service identifiers such as ServerId_in_Ay and Serverld_in_By, and transaction identifiers such as TrxId.

In embodiments, after obtaining the identifiers of the different back-end connections corresponding to the same front-end connection, the routing node 300 may remotely create the associated session logical identifier in the source database node 100. In some other embodiments, the routing node 300 may further send the identifiers of the different back-end connections corresponding to the same front-end connection to the source database node 100. The source database node 100 may create the associated session logical identifier based on the identifiers of the different back-end connections corresponding to the same front-end connection. In other words, the source database node 100 may set the associated session logical identifier in a plurality of implementations. This is not limited in embodiments.

S304: The routing node 300 receives a structured query language command T1 sent by the application 20.

A structured query language command is usually generated through compiling in a structured query language SQL. The structured query language command may indicate to perform a data operation on data in a database node (the source database node 100 or the destination database node 200). For example, the structured query language command may indicate to perform an operation, for example, addition, deletion, query, or modification on the data in the database node.

A transaction is a combination of one or more data operations. For ease of understanding, the following uses transfer as an example to describe the transaction. In this example, the application 20 is a mobile bank application. After creating a session in the source database node 100 through the application 20, a user may perform a transfer operation. The application 20 may generate a transfer transaction in response to the transfer operation. The transfer transaction includes the following two structured query language commands: (a) deducting a specified amount of money from an account A; and (b) adding the specified amount of money to an account B. The routing node 300 may receive the structured query language command sent by the application 20.

Figure 4:
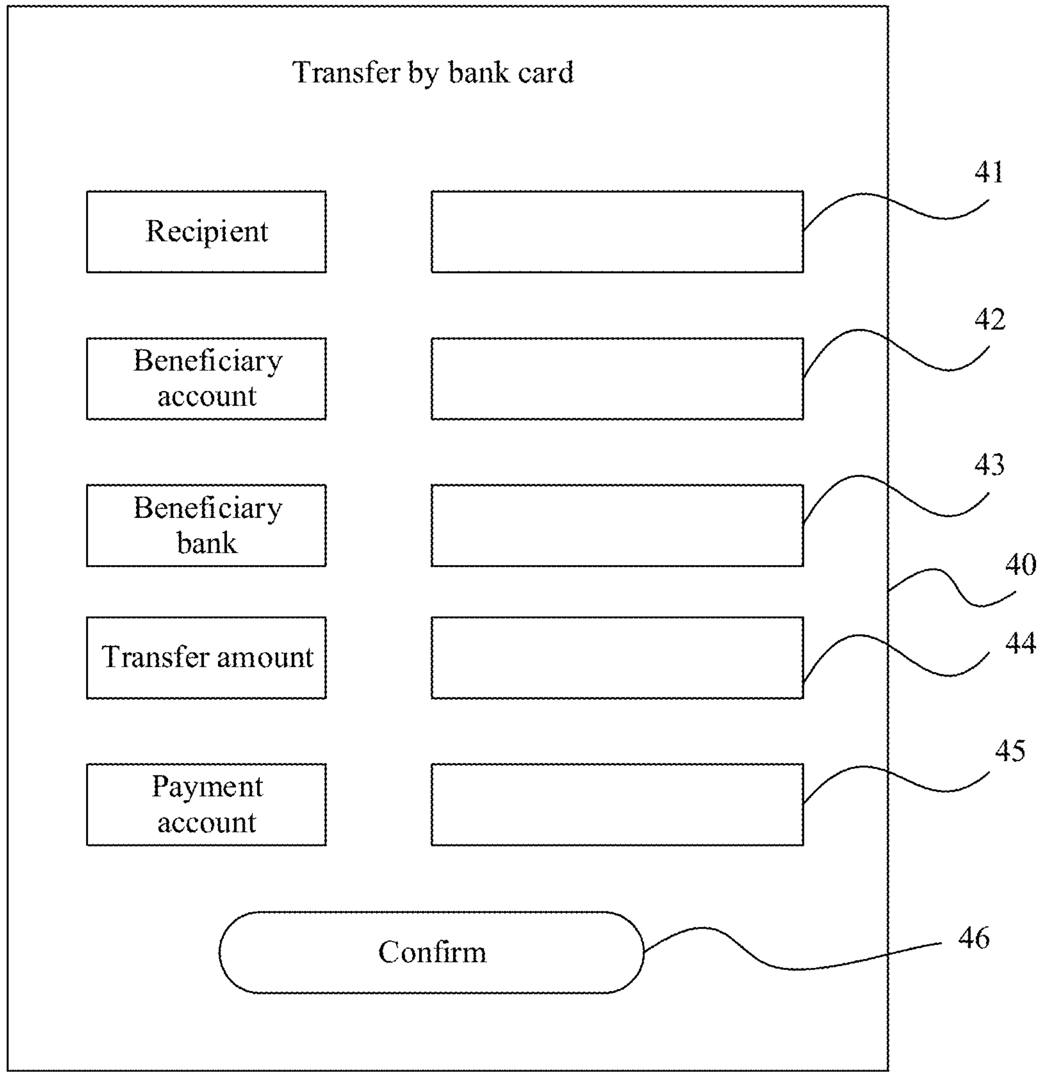
FIG. 4 is an interface diagram of a transfer operation interface according to an embodiment of this application.

In some possible implementations, the application 20 may provide a data operation interface. The data operation interface may be a graphical user interface (GUI) or a command user interface (CUI). The user may trigger a data operation through a control provided by the data operation interface or a command line tool, and the application 20 generates a transaction in response to the data operation of the user, where the transaction includes one or more structured query language commands. FIG. 4 is an interface diagram of a transfer operation interface in the mobile bank. As shown in FIG. 4, the transfer operation interface 40 includes a recipient configuration control 41, a beneficiary account configuration control 42, a beneficiary bank configuration control 43, a transfer amount configuration control 44, and a payment account configuration control 45. The user may configure corresponding recipient information, payment information, and a transfer amount through the configuration controls. The transfer operation interface 40 further includes a confirmation control 46, and after the user triggers the confirmation control 46, the application 20 may generate a transfer transaction. The application 20 may sequentially send structured query language commands included in the transaction. Correspondingly, the routing node 300 may sequentially receive the structured query language commands included in the transaction. For ease of differentiation, in embodiments of this application, the structured query language commands received this time are denoted as the structured query language command T1.

S306: The routing node 300 forwards the structured query language command T1 to the source database node 100.

In embodiments, the routing node 300 may maintain a routing table. The routing node 300 may forward the received structured query language commands, for example, the structured query language command T1, through an entry in the routing table, to ensure security of data in the source database node 100.

S308: The source database node 100 returns a return code of the structured query language command T1 to the routing node 300.

The source database node 100 may execute the structured query language command under scheduling of the control node 400, for example, execute the structured query language command T1, to obtain an execution result of the structured query language command T1. The execution result may include operation context and a transaction state. The operation context may include a system variable, a user defined variable, a transaction status, a user temporary table, or the like.

Figure 5:
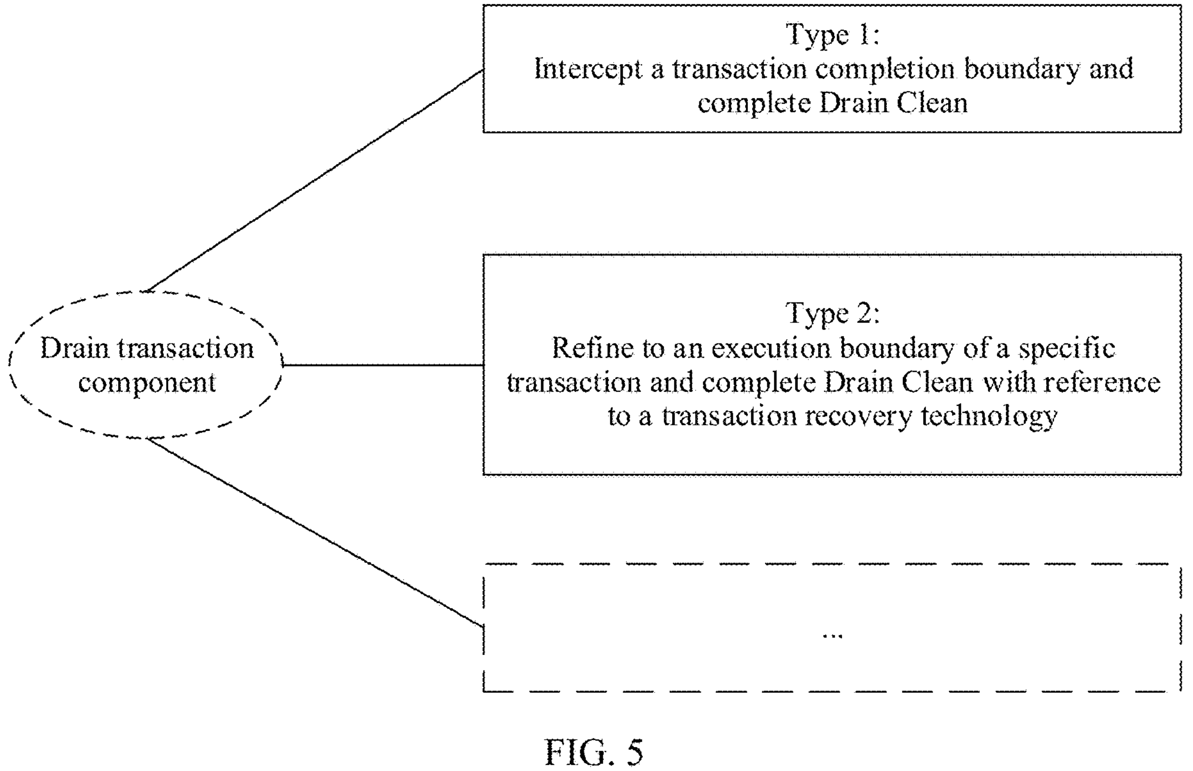
FIG. 5 is a diagram of a granularity of drain transaction according to an embodiment of this application.

When executing the structured query language command, the source database node 100 may further execute drain transaction (drain transaction). The drain transaction refers to monitoring a running transaction, and blocking an operation on a corresponding session when a specified execution site is reached. The source database node 100 may execute the drain transaction through a drain transaction component in a database engine kernel. It should be noted that, the source database node 100 supports drain transaction executed at different granularities. Refer to a diagram of a granularity of drain transaction shown in FIG. 5, the database engine kernel includes drain transaction components of different granularities. One drain transaction component is configured to intercept a transaction completion boundary, to determine that a transaction is drained clean (drain clean), and another drain transaction component is configured to intercept an execution boundary in a transaction. In some embodiments, the execution boundary in the transaction may be a command completion boundary set in the transaction. It should be noted that the database engine kernel may further include a drain transaction component of another granularity. This is not limited in embodiments.

The source database node 100 may generate a return code based on a result of the drain transaction. Specifically, when the transaction reaches a specified execution site, for example, reaches the transaction completion boundary or the execution boundary in the transaction, the source database node 100 may generate a return code indicating that a corresponding query command is executed at the destination database node, where the return code is, for example, "ALT Retry". When the transaction does not reach the specified execution site, for example, does not reach the transaction completion boundary or the execution boundary in the transaction, the source database node 100 may generate a return code indicating that execution of a current query command is completed, where the return code is, for example, "OK". "OK" indicates that the current query command is executed, and may not be repeatedly executed after the current query command is switched to the destination database node 200. In the example in FIG. 3A and FIG. 3B, the return code of the structured query language command T1 may be "OK".

S310: The routing node 300 returns the return code of the structured query language command T1 to the application 20.

After receiving the return code, the routing node 300 returns the return code to the application 20, so that the application 20 performs a subsequent operation based on the return code. In embodiments of FIG. 1, the return code of the structured query language command T1 is "OK". In view of this, the application 20 may continue to send a structured query language command, for example, send a structured query language command T2, so that the routing node 300 routes the structured query language command T2 to a back-end database node, for example, the source database node 100.

S312: The routing node 300 receives the structured query language command T2 sent by the application 20.

S314: The routing node 300 forwards the structured query language command T2 to the source database node 100.

S316: The source database node 100 returns a return code of the structured query language command T2 to the routing node 300.

S318: The routing node 300 returns the return code of the structured query language command T2 to the application 20.

The structured query language command T2 may be a command after the structured query language command T1 in the transaction. For example, the structured query language command T1 may be a command used to deduct the specified amount of currency from the account A. For another example, the structured query language command T2 may be a command used to add the specified amount of currency to the account B. The structured query language command T2 may alternatively be a command in another transaction.

For specific implementations of S312 to S318, refer to related content descriptions of S304 to S310. It should be noted that S312 to S318 may not be performed when the node switchover method in embodiments of this application is performed. For example, when the transaction includes one structured query language command, S312 to S318 may not be performed in the node switchover method in embodiments of this application.

It should be noted that FIG. 3A and FIG. 3B are described by using an example in which the structured query language command T1 and the structured query language command T2 are commands in the same transaction. In another possible implementation of embodiments of this application, the structured query language command T1 and the structured query language command T2 may alternatively be commands in different transactions. For example, the structured query language command T1 may be a command in a first transaction, and the structured query language command T2 may be a command in a second transaction.

S320: The routing node 300 receives a structured query language command T3 sent by the application 20.

S322: The routing node 300 forwards the structured query language command T3 to the source database node 100.

S324: The source database node 100 returns a return code of the structured query language command T3 to the routing node 300. When the return code of the structured query language command T3 indicates that the structured query language command T3 is executed at the destination database node, S326 is performed.

In comparison with a case in which a drain transaction action performed by a proxy for connection enhancement is completely separated from database engine transaction processing logic, and the proxy can only attempt to intercept an SQL command and expect that the transaction is completely executed, where an interception granularity is a transaction level, in embodiments of this application, drain transaction components with different capabilities can be deployed in the database engine kernel, to determine different transaction execution granularities and precision.

S326: The routing node 300 holds the structured query language command T3.

Specifically, the routing node 300 suspends the structured query language command T3, to prepare for copying content in the first session object to the second session object.

It should be noted that, before S320 to S326, more structured query language commands and corresponding return codes may be further transmitted, and the source database node 100 may execute structured query language commands until the transaction is executed to the specified execution site. In addition, S326 is an optional step. For example, when the structured query language command T3 is the last command of a transaction, the routing node 300 may not perform S326.

S328: The control node 400 sends a clone session command to the source database node 100.

The clone session command indicates the source database node 100 to clone the content in the first session object to the second session object. The control node 400 may generate the clone session command through a clone session function like RDS_ALT clone_Session ( ) and send the clone session command to the source database node 100, to execute a clone session component in the database engine kernel of the source database node 100.

S330: The source database node 100 executes clone session, and sends target data in the first session object to the second session object.

The content in the first session object may include an execution result of the foregoing query command (which may also be referred to as a first query command for ease of description). The execution result includes data for executing a subsequent query command (which may also be referred to as a second query command for ease of description), where the data is the target data. The target data may include operation context and a transaction state. The operation context may include one or more of a system variable, a user defined variable, a transaction status, or a user temporary table.

The source database node 100 clones the target data in the first session object to the second session object, to lay a foundation for subsequently providing a service through the destination database node 200. The source database node 100 executes clone session in a plurality of implementations.

In some possible implementations, the source database node 100 may execute clone session in a logical manner of connection retention of the routing node 300. In some other possible implementations, the source database node may alternatively execute clone session in a physical manner of replicating a session through a session channel.

Compared with the manner of connection retention of the routing node 300, the physical manner of replicating the session through the session channel can avoid a problem that, because a large quantity of commands are re-executed in the destination database node 200, consistency counterexamples exist in a large quantity of scenarios.

S332: The routing node 300 receives an end command of the control node 400.

Specifically, after completing clone session, the source database node 100 may return a clone session completion notification to the control node 400. The control node 400 may generate the end command based on the clone session completion notification, and send the end command to the routing node 300.

S334: The routing node 300 forwards the structured query language command T3 to the second session object in the destination database node 200 based on the associated session logical identifier.

After receiving the end command, the routing node 300 may determine, based on the associated session logical identifier, the second session object that is in the destination database node 200 and that corresponds to the first session object in the current source database node 100, and forward the suspended structured query language command like the structured query language command T3 to the second session object, to execute the structured query language command in the second session object.

In embodiments, the structured query language command T1, the structured query language command T2, and the structured query language command T3 may be in a same transaction. When the structured query language command T3 is executed in a session object (for example, the first session object) of the source database node 100, if ALT switchover occurs, the destination database node 200 may recover the transaction in the destination database node 200 based on a transaction (for example, the first transaction) of the source database node 100. For ease of description, the transaction in the destination database node 200 may alternatively be referred to as a third transaction. In this way, executing the structured query language command T3 in the third transaction is actually equivalent to executing the structured query language command T3 in the first transaction, that is, executing the structured query language command T1, the structured query language command T2, and the structured query language command T3 in a same transaction. This can still meet atomicity (atomicity), consistency (consistency), isolation (isolation), and durability (durability) of the transaction.

S336: The destination database node 200 returns a return code of the structured query language command T3 to the routing node 300.

The destination database node 200 may execute the structured query language command T3, to obtain an execution result. The destination database node 200 may generate the return code of the structured query language command T3, and then return the return code of the structured query language command T3 to the routing node 300. In embodiments, the return code of the structured query language command T3 that is returned by the destination database node 200 may be "OK".

S338: The routing node 300 returns the return code of the structured query language command T3 to the application 20.

It should be noted that S336 and S338 may not be performed when the node switchover method in embodiments of this application is performed.

S340: The routing node 300 receives a structured query language command T4 sent by the application 20.

S342: The routing node 300 forwards the structured query language command T4 to the destination database node 200.

d. For example, the structured query language command T4 is included. The routing node 300 may further forward the subsequent structured query language command like the structured query language command T4 to the second session object when receiving the end command.

S344: The destination database node 200 executes the structured query language command T4 by using the target data.

The structured query language command T3 and the structured query language command T4 may be commands in a same transaction, for example, may be commands in one transfer transaction. The destination database node 200 may recover the transaction in the second session object based on the target data, to continue to execute the structured query language command T4. In some other embodiments, the structured query language command T3 and the structured query language command T4 may be commands in different transactions. There is a dependency relationship between the transactions. In view of this, the destination database node 200 may execute the structured query language command T4 by using the target data.

S346: The destination database node 200 returns a return code of the structured query language command T4 to the routing node 300.

S348: The routing node 300 returns the return of the structured query language command T4 to the application 20.

In this example, the return code of the structured query language command T4 that is returned by the destination database node 200 to the routing node 300 may be "OK".

A function of S346 and S348 is to notify an execution status. In view of this, S346 and S348 may not be performed in the node switchover method in embodiments of this application.

In embodiments shown in FIG. 3A and FIG. 3B, execution of the structured query language command is used as an example for description. In another possible implementation of embodiments of this application, a query command written in another query language may be used.

In view of the foregoing content descriptions, an embodiment of this application provides a node switchover method. In the method, the routing node 300 does not need to participate in complex processing processes of the drain transaction and the clone session, and processing of the drain transaction and the clone session is performed on a database node like the source database node 100. The routing node 300 does not actively intercept a query command, but processes a return code of the query command. The routing node 300 does not need to record a transaction state in real time, and caches a query command that changes operation context, to avoid consumption of a large quantity of processor and memory resources, reduce costs and overheads of the routing node, and ensure service performance. In addition, the routing node 300 only needs to provide an ALT routing capability on the basis of creating a back-end session object, where the ALT routing capability may be implemented through a lightweight proxy or connector. A connector of a client may integrate a routing capability to implement ATL switchover without middleware.

Further, when the method is applied to a cloud service, the application 20 is connected to the routing node 300 without depending on a special client and changing a program of the application 20. In an ALT switchover process, a related interface does not need to be additionally invoked to participate in ALT switchover. This simplifies a procedure and complexity of ALT switchover.

According to the node switchover method provided in embodiments of this application, an embodiment of this application further provides the foregoing node switchover system 10. The following describes the node switchover system 10 provided in embodiments of this application with reference to the accompanying drawings.

Refer to a system architecture diagram of the node switchover system 10 shown in FIG. 1. The system 10 includes a source database node 100 and a destination database node 200.

The source database node 100 is configured to execute a first query command, and send target data to the destination database node 200, where the target data is data for executing a second query command in an execution result of the first query command.

The destination database node 200 is configured to execute the second query command by using the target data.

In some possible implementations, the first query command is a command in a first transaction, and the second query command is a command in a second transaction.

In some possible implementations, the first query command and the second query command are commands in a same transaction.

In some possible implementations, the system 10 further includes:

a routing node 300, configured to: before the destination database node 200 executes the second query command by using the target data, route the first query command to the destination database node 200, so that the destination database node 200 executes the first query command.

In some possible implementations, the source database node 100 is further configured to:

send a return code to the routing node after detecting that the transaction reaches a specified execution site, where the return code indicates the destination database node to execute the first query command.

In some possible implementations, the source database node 100 includes a first session object, the destination database node 200 includes a second session object, and the source database node 100 is further configured to:

set an associated session logical identifier, where the associated session logical identifier identifies the first session object and the second session object, and the second query command is sent to the second session object.

The destination database node 200 is configured to:

use the target data in the second session object to execute the second query command.

In some possible implementations, the associated session logical identifier further records a transaction identifier, and a transaction block corresponding to the transaction identifier is shared by the first session object and the second session object.

In some possible implementations, the source database node 100 is a database node connected to an application before a flavor or version change of the application, and the destination database node 200 is a database node connected to the application after the flavor or version change of the application.

In some possible implementations, the source database node 100 and the destination database node 200 belong to a same service cluster, and a load of the source database node 100 is greater than a load of the destination database node 200.

In some possible implementations, the source database node 100 is a primary node, and the destination database node 200 is a backup node.

In some possible implementations, the source database node 100 and the destination database node 200 are storage-compute decoupled cloud native database nodes.

The node switchover system 10 in embodiments of this application may correspondingly perform the methods described in embodiments of this application, and the foregoing and other operations and/or functions of the modules/units of the node switchover system 10 are separately used to implement corresponding procedures of the methods in embodiments shown in FIG. 3A and FIG. 3B. For brevity, details are not described herein again.

An embodiment of this application further provides a computer cluster. The computer cluster includes at least one computer, and any one of the at least one computer may come from a cloud environment or an edge environment, or may be a terminal. The computer cluster is configured to implement a function of the node switchover system 10 in embodiments shown in FIG. 1.

Figure 6:
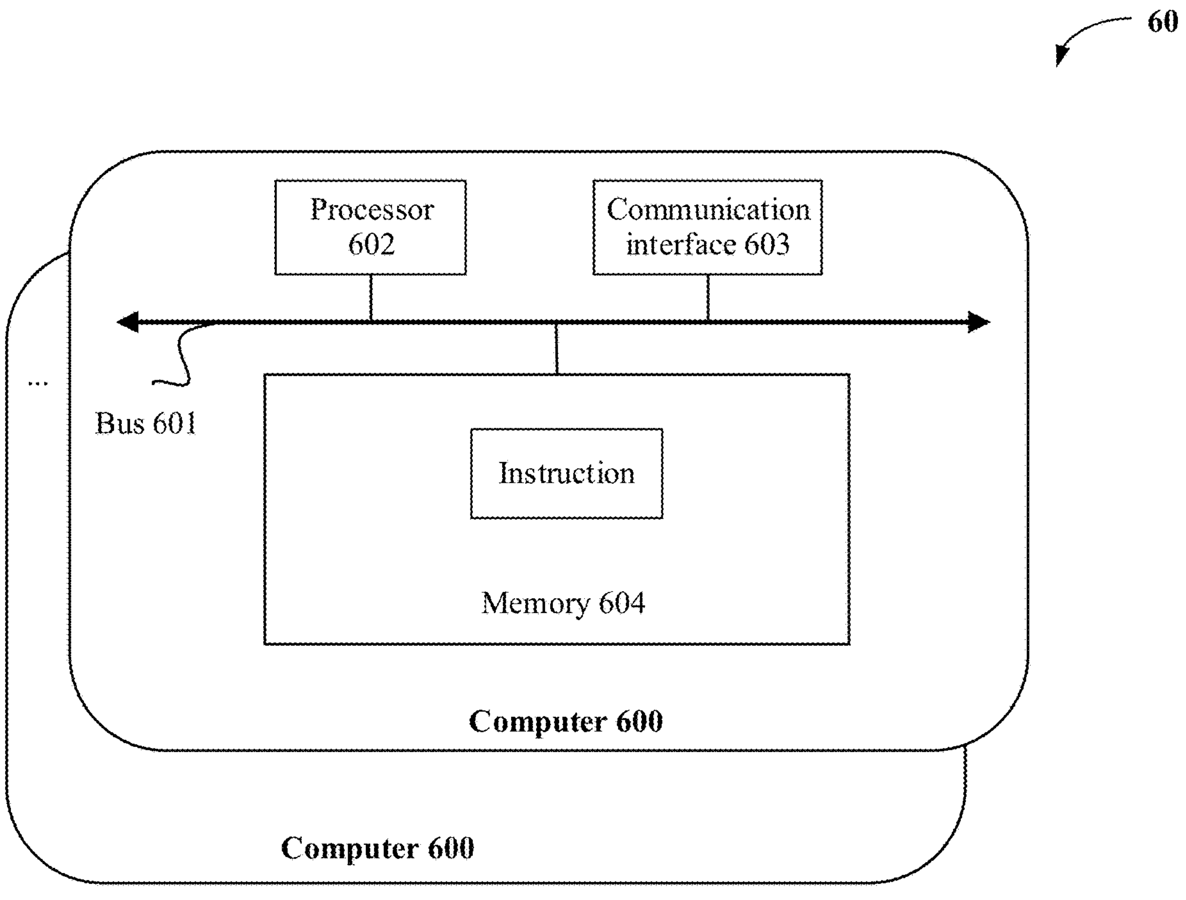
FIG. 6 is a diagram of a structure of a computer cluster according to an embodiment of this application.

FIG. 6 is a diagram of a structure of a computer cluster. As shown in FIG. 6, the computer cluster 60 includes a plurality of computers 600. The computer 600 includes a bus 601, a processor 602, a communication interface 603, and a memory 604. The processor 602, the memory 604, and the communication interface 603 communicate with each other through the bus 601.

The bus 601 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 6, but this does not mean that there is only one bus or only one type of bus.

The processor 602 may be any one or more of the following processors: a central processing unit (CPU), a graphics processing unit (GPU), a microprocessor (MP), a digital signal processor (DSP), or the like.

The communication interface 603 is configured to communicate with the outside. For example, a communication interface 603 of one computer is configured to obtain a first query command and send target data to a destination database node, a communication interface 603 of another computer is configured to receive the target data and obtain a second query command, and the like.

The memory 604 may include a volatile memory (volatile memory), for example, a random access memory (RAM). The memory 604 may further include a non-volatile memory, for example, a read-only memory (ROM), a flash memory, a hard disk drive (HDD), or a solid state drive (SSD).

The memory 604 stores computer-readable instructions, and the processor 602 executes the computer-readable instructions, so that the computer cluster 60 performs the node switchover method (or implements a function of the node switchover system 10).

Specifically, when the embodiments of the system shown in FIG. 1 are implemented, and functions of components of the node switchover system 10 described in FIG. 1 are implemented by using software, software or program code for executing functions of the components in FIG. 1 may be stored in at least one memory 604 in the computer cluster 60. At least one processor 602 executes the program code stored in the memory 604, so that the computer cluster 60 performs the node switchover method.

The computer cluster 60 may include a first computer and a second computer. The first computer may be configured to implement a function of the source database node 100, the second computer may be configured to implement a function of the destination database node 200, and the first computer and the second computer implement ALT switchover through interaction.

An embodiment of this application further provides a computer-readable storage medium. The computer-readable storage medium may be any usable medium that can be stored in a computer, or a data storage device like a data center, integrating one or more usable media. The usable medium may be a magnetic medium (for example, a floppy disk, a hard disk, or a magnetic tape), an optical medium (for example, a DVD), a semiconductor medium (for example, a solid state disk), or the like. The computer-readable storage medium includes instructions, and the instructions instruct a computer or a computer cluster to perform the node switchover method.

An embodiment of this application further provides a computer program product. The computer program product includes one or more computer instructions. When the computer instructions are loaded and executed on a computer, the procedure or functions according to embodiments of this application are all or partially generated. The computer instructions may be stored in a computer-readable storage medium, or may be transmitted from one computer-readable storage medium to another computer-readable storage medium. For example, the computer instructions may be transmitted from a website, a computer, or a data center to another website, computer, or data center in a wired (for example, a coaxial cable, an optical fiber, or a digital subscriber line (DSL)) or wireless (for example, infrared, radio, or microwave) manner. The computer program product may be a software installation package. When any one of the foregoing node switchover methods needs to be used, the computer program product may be downloaded and executed on a computer or a computer cluster.

Descriptions of procedures or structures corresponding to the accompanying drawings have respective focuses. For a part that is not described in detail in a procedure or structure, refer to related descriptions of other procedures or structures.

What is claimed is:

1. A node switchover method, comprising:

executing, by a source database node, a first query command received from a routing node, wherein the first query command is in a first transaction of a first session object;

sending, by the source database node to the routing node, a return code of the first query command after detecting that the first transaction reaches a specified execution site, wherein the return code indicates a destination database node to execute the first query command, and the specified execution site includes a transaction completion boundary or an execution boundary in the first transaction;

forwarding, by the routing node in response to the return code, the first query command to the destination database node for execution;

sending, by the source database node, target data to the destination database node, wherein the target data comprises at least part data of an execution result of the first query command and the at least part data of the execution result of the first query command is used for executing a second query command;

executing, by the destination database node, the first query command; and executing, by the destination database node, the second query command by using the target data.

2. The method according to claim 1, wherein the second query command is a command in a second transaction of a second session object.

3. The method according to claim 1, wherein the first query command and the second query command are commands in a same transaction.

4. The method according to claim 1, wherein the source database node comprises the first session object, and the destination database node comprises a second session object; and the method further comprises:

setting, by the source database node, an associated session logical identifier, wherein the associated session logical identifier identifies the first session object and the second session object, and the second query command is sent to the second session object;

wherein the target data further comprises contents in the first session object to be cloned to the second session object in the destination database node; and wherein the executing, by the destination database node, the second query command by using the target data comprises:

executing, by the destination database node, the second query command by using the target data in the second session object.

5. The method according to claim 4, wherein the associated session logical identifier comprises a transaction identifier, wherein a transaction block corresponding to the transaction identifier is shared by the first session object and the second session object.

6. The method according to claim 1, wherein the source database node is a database node connected to an application before a flavor or version change of the application, and the destination database node is a database node connected to the application after the flavor or version change of the application.

7. The method according to claim 1, wherein the source database node and the destination database node belong to a same service cluster, and a load of the source database node is greater than a load of the destination database node.

8. The method according to claim 1, wherein the source database node is a primary node, and the destination database node is a backup node.

9. The method according to claim 1, wherein the source database node and the destination database node are storage-compute decoupled cloud native database nodes.

10. A node switchover system, comprising a source database node, a routing node and a destination database node, wherein the source database node is configured to:

execute a first query command received from the routing node, wherein the first query command is in a first transaction of a first session object;

send a return code of the first query command to the routing node after detecting that the first transaction reaches a specified execution site, wherein the return code indicates a destination database node to execute the first query command, and the specified execution site includes a transaction completion boundary or an execution boundary in the first transaction; and send target data to the destination database node, wherein the target data comprises at least part data of an execution result of the first query command and the at least part data of the execution result of the first query command is used for executing a second query command;

the routing node is configured to forward the first query command to the destination database node after receiving the return code of the first query command returned by the source database node; and the destination database node is configured to execute the first query command and execute the second query command by using the target data.

11. The system according to claim 10, wherein the second query command is a command in a second transaction of a second session object.

12. The system according to claim 10, wherein the first query command and the second query command are commands in a same transaction.

13. The system according to claim 10, wherein the source database node comprises the first session object, and the destination database node comprises a second session object; and the source database node is further configured to:

set an associated session logical identifier, wherein the associated session logical identifier identifies the first session object and the second session object, and the second query command is sent to the second session object; and wherein the destination database node is configured to:

execute the second query command by using the target data in the second session object.

14. The system according to claim 13, wherein the associated session logical identifier comprises a transaction identifier, wherein a transaction block corresponding to the transaction identifier is shared by the first session object and the second session object.

15. The system according to claim 10, wherein the source database node is a database node connected to an application before a flavor or version change of the application, and the destination database node is a database node connected to the application after the flavor or version change of the application.

16. The system according to claim 10, wherein the source database node and the destination database node belong to a same service cluster, and a load of the source database node is greater than a load of the destination database node.

17. A non-transitory computer-readable medium storing code for a computer device cluster, the code comprising instructions executable by one or more processors of the computer device cluster to:

execute, by a source database node, a first query command received from a routing node, wherein the first query command is in a first transaction of a first session object;

send, by the source database node to the routing node, a return code of the first query command after detecting that the first transaction reaches a specified execution site, wherein the return code indicates a destination database node to execute the first query command, and the specified execution site includes a transaction completion boundary or an execution boundary in the first transaction;

forward, by the routing node in response to the return code, the first query command to the destination database node for execution;

send, by the source database node, target data to the destination database node, wherein the target data comprises at least part data of an execution result of the first query command and the at least part data of the execution result of the first query command is used for executing a second query command;

execute, by the destination database node, the first query command; and execute, by the destination database node, the second query command by using the target data.

18. The non-transitory computer-readable medium according to claim 17, wherein the second query command is a command in a second transaction of a second session object.

19. The non-transitory computer-readable medium according to claim 17, wherein the first query command and the second query command are commands in a same transaction.

20. The non-transitory computer-readable medium according to claim 17, wherein the source database node comprises the first session object, the destination database node comprises a second session object, and the target data comprises contents in the first session object to be cloned to the second session object in the destination database node; wherein the code further comprises instructions executable by the one or more processors of the computer device cluster to:

set, by the source database node, an associated session logical identifier, wherein the associated session logical identifier identifies the first session object and the second session object, and the second query command is sent to the second session object;

wherein the second query command is executed using the target data in the second session object.

* * * * *